United States Patent [19]

Gaudard et al.

[11] 4,162,863
[45] Jul. 31, 1979

[54] DEVICE FOR SOIL IRRIGATION

[75] Inventors: Yves Gaudard; Henri Guillemaud, both of Lyons; Jacques Perfetti, Caluire, all of France

[73] Assignee: Rhone-Poulenc-Textile, Lyons, France

[21] Appl. No.: 842,311

[22] Filed: Oct. 14, 1977

[30] Foreign Application Priority Data

Oct. 28, 1976 [FR] France .................. 76 32941
Jan. 7, 1977 [FR] France .................. 77 20549

[51] Int. Cl.² ............................................ E02B 13/00
[52] U.S. Cl. .............................. 405/45; 210/484; 210/502; 239/55; 239/145
[58] Field of Search .................. 61/11, 13, 10, 12; 239/145, 53, 54, 55, 56, 34; 222/187; 47/48.5; 428/913; 210/484, 502

[56] References Cited

U.S. PATENT DOCUMENTS

| 3,441,140 | 4/1969 | Thurber | 61/11 |
| 3,767,520 | 10/1973 | Dick et al. | 222/187 |
| 3,799,442 | 3/1974 | Delmer | 239/145 |
| 3,889,678 | 6/1975 | Chatterjee et al. | 260/17.4 CL |
| 3,939,875 | 2/1976 | Osborn et al. | 61/12 |
| 4,061,272 | 12/1977 | Winston | 61/13 |

Primary Examiner—Robert L. Wolfe
Assistant Examiner—Alex Grosz
Attorney, Agent, or Firm—Sherman & Shalloway

[57] ABSTRACT

An irrigating device formed from an absorbent product, such as a polymeric pulp or hydrophilic textile contained within a filtering envelope, such as a woven, knitted or non-woven fabric. The device is placed in the ground in communication with a source of water which may be above or below ground. The irrigation device provides for a uniform rate of irrigation of the soil in which it is placed, requires less water than conventional irrigation devices providing the same overall coverage, and is not subject to dogging or blockage, as with conventional irrigation devices.

In one embodiment for preparing the irrigation device, the absorbent product is in the form of a tow of hydrophilic continuous filament and the textile filter envelope is produced in a continuous in-line operation in conjunction with the production of the tow.

The irrigation device can be applied to the irrigation of soils to facilitate the growth of plants, trees, crops and the germination of seeds.

7 Claims, 2 Drawing Figures

DEVICE FOR SOIL IRRIGATION

BACKGROUND OF THE INVENTION

1. Field of The Invention

The present invention relates to an irrigation device for irrigating soils, to the process for manufacturing such irrigation device and to the process for using such irrigation device in irrigating soils. More particularly, the present invention relates to an irrigating device of the type in which a fixed or renewable source of water connected to the irrigating device is slowly, but continuously applied to the soil.

2. Discussion of the Prior Art

In the irrigation of soils, for example, to promote the growth of crops, water is generally supplied either to the surface of the soil or directly into the soil. This has typically been accomplished utilizing drip type devices or porous or perforated tubes through which it is possible to establish an equilibrium between the water source, or zone of excess moisture and the soil of insufficient moisture content.

However, particularly from the economic point of view, these prior art devices are expensive and bulky. In addition, it has been technically difficult when using porous or perforated tubes to ensure moisture equilibrium, because of the necessity for filtering the water from the water source to avoid blockage of the installation. In this regard, the inorganic salts present in water tend to block the holes or the pores of the porous or perforated tubes. This tendency is particularly noticeable in the case of intermittent operation of the irrigation devices. Therefor, it has proven necessary to install, generally near the irrigation orifices, means for avoiding such blockage. However, even when such filtering devices have been installed, it has been difficult to regulate the irrigation flow rate and in addition, frequent maintenance is required.

Still further, and particularly in connection with sloping terrains, it has been found that these types of irrigation devices require an excess consumption of irrigation liquid, which is believed to be primarily due to the fact that since the water tends to saturate the lowest zone of the terrain, it is necessary to supply additional irrigation liquid to the upper zones to ensure constant or uniform wetting of the soil.

Still further, in the case of surface installations of the irrigation devices, there are significant losses of irrigation liquid by evaporation and consequently, also an increased danger of blockage of the holes and pores of the irrigation tubes. This defect is particularly noticeable in regions which are very sunny and in regions with sandy terrain.

SUMMARY OF THE INVENTION

It is therefore an object of this invention to provide an irrigation device which is both simple to use and inexpensive to manufacture and maintain.

It is another object of this invention to provide an irrigation device which is not subject to blockage or clogging as a result of precipitation of insoluble salts or other constituents inherently present in or added to irrigation liquids.

It is still a further object of this invention to provide an irrigation device for irrigation of soils which require a reduced amount of irrigation liquid compared to conventional irrigation devices to obtain the same coverage, that is, moisture content of the irrigated soil.

Briefly, these and other objects of this invention, which will become more apparent from the following detailed description, and drawings in which FIG. 1 shows schematically a section of the irrigation device according to example 1, and FIG. 2 shows schematically a section of the irrigation device according to example 3, are obtained by an irrigation device which is formed from an absorbent polymeric or textile material contained within a textile filter envelope. The absorbent product can be any absorbent polymeric pulp or hydrophilic textile and particularly, hydrophilic textile in the form of a tow of continuous, crimped or non-crimped filaments. The textile filter envelope can be any woven, knitted or non-woven fabric and preferably, a textile material which is non-biodegradeable, that is, a textile material which can withstand the soil environment in which it will be placed.

The irrigation device of this invention can be formed into any desireable shape or configuration depending upon the terrain in which it will be utilized and the desired degree of irrigation and moistening of the soil.

When the absorbent product is an absorbent, amorphous, synthetic polymer pulp, it can be obtained by precipitating the polymeric material, from its solution in a solvent for the polymeric material, in a bath containing a non-solvent for the polymeric material, but which is miscible with the solvent.

In use, the irrigation device is buried in the soil, in the zone to be irrigated, and connected by suitable means to a source of irrigating liquid. The irrigation device can be placed in the ground either horizontally, vertically or obliquely disposed with respect to the surface.

The water source or other aqueous irrigation liquid can be any natural or artificial source, including above ground or underground installations, as well as natural bodies of water above and below the surface.

DETAILED DESCRIPTION OF THE INVENTION AND PREFERRED EMBODIMENTS

Figure 1:
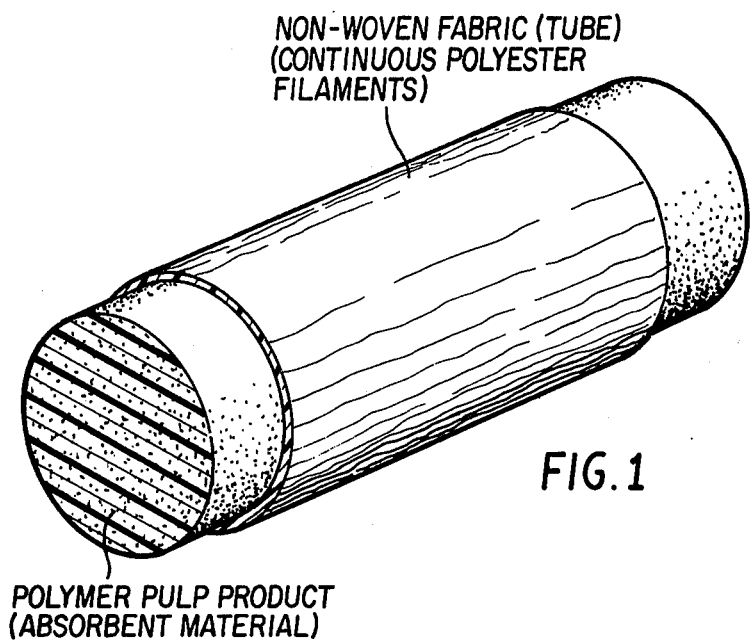

As previously stated, the irrigation device of this invention comprises an absorbent, amorphous, synthetic polymer pulp or an absorbent textile in the form of a tow of hydrophilic, continuous filaments.

The pulps are generally preferred because of their high absorption capacities, especially towards water. For example, pulp formed from polyamides and polyesters generally absorb up to fifteen times their own weight of water.

The absorbent pulps which are particularly useful in the irrigation devices of this invention, are those having a bulk density of between 0.01 and 0.5 g/cm$^3$, preferably between 0.04 and 0.2 g/cm$^3$, and also, possessing a specific surface area, determined by gas absorption according to the Brunauer-Emmet-Teller (B.E.T.) method of between about 2 to about 12 m$^2$/g.

Basically, these amorphous absorbent pulp materials can be obtained by precipitation of a polymeric material from its solution in a solvent therefor, in a bath containing essentially a non-solvent for the polymeric materials, which non-solvent is miscible with the solvent. The pulp is thereafter recovered from the solvent and non-solvent mixture by filtration, decantation, centrifugation, or any other suitable means. These pulp forming techniques are in themselves well known in the art and do not, per se, form part of the inventive feature of the subject invention.

According to one preferred method for forming the amorphous polymer pulps, a solution of the polymer is introduced, with stirring, into a bath containing essentially a non-solvent for the polymeric material. The resulting pulp is thereafter filtered from the solvent/non-solvent bath and then drained, washed and dried. The pulps can also be obtained by a continuous method in which a stream of solution of the polymer is injected into a stream of non-solvent and the resulting pulp is then collected on a moving conveyor belt. After draining, washing, suction-draining and drying, the pulp is coarsely disaggregated to form the final absorbent amorphous pulp product.

Generally, any synthetic polymeric material from which absorbent pulps can be prepared, can be used in the irrigation device of this invention. For instance, mention can be made of such cellulosic compounds as cellulose acetate and cellulose triacetate or synthetic polymers, such as polyamides, polyesters, vinyl polymers, polyolefins, polyacrylonitriles, and the like. Because of their high absorption capacities, absorbent pulps formed from polyamides and polyesters are most preferred.

The absorbent product may also be formed from hydrophilic textile materials, preferably in the form of a tow of continuous, crimped or non-crimped filaments. This embodiment of the irrigation device of the present invention has the advantage that the textile filter envelope can be produced in a continuous in-line operation in conjunction with the manufacture of the tow. For example, this continuous production can be achieved by tubular knitting or by braiding, lapping or the like of the envelope about the tow, at the same rate by which the tow is produced.

When desired, the tow can be crimped by any conventional crimping technique, such as by mechanical means or fluid means. The crimping operation can also be carried out as a continuous in-line operation during the manufacturing operation. The tubular knitting operation provides an elongate volume whose cross-section may, for example, be circular, oval, rectangular, and the like.

The filamentary material of the hydrophilic textile tow may be any artificial or synthetic filamentary textile material which is either naturally hydrophilic or which has been rendered hydrophilic by suitable chemical treatment. Techniques for rendering filamentary textile materials hydrophilic are well known in the art and do not, per se, form a part of this invention.

The amount of the absorbent product in the irrigation device of this invention is not, per se, critical, but should naturally be sufficient to absorb sufficient irrigation liquid to accomplish the desired degree of wetting of the soil. The amount of the absorbent product will therefor, depend on such factors as its absorption capacity, the depth below the ground of the irrigation device, the nature of the soil and climate, the type of crop or other product being irrigated, etc.

The textile filter envelope used for containing the absorbent product may be any woven, knitted or non-woven fabric. The textile material should, of course, be one which will be able to withstand the soil environment in which it is buried. When the textile filter envelope is of a non-woven material, it is preferably obtained as a "spunbonded" material, although non-woven obtained by dry methods can also be used in this invention.

The weight per square meter and texture of the textile filter envelope are not particularly critical, but will depend, in general, on the nature of the desired irrigation. As previously mentioned, the textile filtering envelope is preferably produced as a continuous in-line operation in conjunction with the operation of assembling the absorbent tow of hydrophilic textile. In this regard, it should be understood that the word "tow" as used herein, is intended to include not only a single tow, but a plurality of tows. In fact, particularly for relatively thick irrigation devices having large absorption capacities, it would generally be preferred to combine several tows in a single device. In this case too, the filter envelope can be produced as a continuous in-line operation in conjunction with the operation of assembling the tows of the hydrophilic textile filamentary materials.

This invention is, of course, not limited to forming the textile filter envelope continuously with the formation of the tow, but the textile filter envelope can also be placed around the tow after the manufacture of the latter.

Also, the irrigation device of this invention need not necessarily be in the form of a tubular product of uniform cross-section, but may additionally, be in the shape of a flat bag containing the absorbent product, or formed as a plurality of textile webs of suitable width and length, depending upon the desired end use, with the absorbent product placed between the textile webs.

The irrigation device, in use, is located beneath the surface of the soil and is connected through suitable pipes and valves to a source of irrigation liquid. The irrigation device can be placed either horizontally, vertically or at an angle relative to the surface of the soil. The liquid supply can be either a stagnant source or under pressure. Particularly for long lengths of the irrigation device, the liquid supply should be under suitable pressure to assure that all of the absorbent capacity of the absorbent product is utilized. The irrigation liquid is typically water, although other adjuvants such as fertilizers, insecticides, pesticides, nutrient solutions and the like can be added. In addition, where desired, the liquid can be heated.

The irrigation device is located at a suitable depth below the surface of the soil. The depth will depend, in part, on the type of crops to be irrigated, taking into consideration, for example, the root depth of the crops, the amount of moisture needed by the crops, etc., as well as on whether the irrigation device is placed horizontally, vertically or obliquely.

The irrigation device of this invention makes it possible to regulate and meter the moistening and irrigation of all types of soils. By virtue of the filtering property of the textile wrapper and in view of the fact that the water or other aqueous irrigation liquid issues gradually from the absorbent filling, it is possible to maintain constant moisture without water losses or excess feed of water, in such environments as pastures, sports grounds, food crop locations, etc., with or without combination with a greenhouse effect.

With particularly long lengths of the irrigation device of this invention, in order to overcome possible adverse effects due to pressure drops, it is preferred to feed the irrigation liquid to the irrigation device under pressure and/or to have the absorbent product filling packed within the textile filter wrapper somewhat less densely than with shorter lengths of the irrigation device. On the other hand, the irrigation device can be used in short lengths, such as for watering of house plants. The use of the irrigation device for watering house plants is particularly advantageous when it would not otherwise be possible to care for the plant over extended periods of time. By regulating the supply of water to the plants such as, for example, with a valve system, the flow rate to the irrigation device and from the irrigation device to the soil can be regulated to provide the desired degree of moisture. Also, when the irrigation device is intended to cover large areas and consequently, must be of long length, it is possible to use the irrigation device as shorter segments connected to lengths of unobstructed pipe or other conduit. It is also possible to connect the liquid supply to the irrigation device of this invention at a plurality of points along its length in order to counteract any possible unduly high pressure drops inherently present in long lengths of the irrigation device.

Accordingly, the irrigation device of this invention can be used to provide and maintain constant moisture levels in various types of soils for facilitating the growth of plants, crops and trees and for the germination of seeds. The irrigation device is particularly useful in regions, such as desert zones, wherein the water source is present as a sheet or lake under a sandy soil surface. With the irrigation device of this invention, the need to frequently water crops in such areas due to the high rates of evaporation from the heat of the sun and by absorption of the water into the sand, is eliminated. Further, by maintaining the soil at a constant moisture level at a fixed depth below the surface without evaporation, excessive consumption of liquid is avoided making it possible to permit greater preservation of the underground sheets of water.

The present invention will now be described by the following illustrative, non-limiting examples.

EXAMPLE 1

An irrigation device if formed from a tube of 100 m. diameter made from a non-woven fabric of continuous filaments of poly(ethylene glycol terephthalate), weighing 150 g/m$^2$, and this tube is filled with an absorbent product consisting of poly(hexamethylene adipamide) pulp, which is obtained in the following manner:

Poly(hexamethylene adipamide) is dissolved, at a rate of 10% by weight, in 98% strength sulfuric acid, with stirring for four hours. The solution obtained is fed, with stirring, into a bath containing a normal aqueous sodium hydroxide solution. The resulting precipitate is filtered off, then washed at ambient temperature, and thereafter, drained and dried to constant weight. The white dry pulp obtained has a bulk density of 0.6. A section of the irrigation device is shown schematically in FIG. 1.

The irrigation device of 250 cm long thus produced is buried at a depth of 10 centimeters in a trough two meters long containing fine sand of particle size between 100 and 200 microns. The end of the tube is connected to a vessel of five liters capacity containing water. Through capillary action, the water is absorbed by the poly(hexamethylene adipamide) pulp and passes through the permeable non-woven textile filtering wrapper and moistens the sand up to the surface.

Over the course of eight days, samples of sand were taken at various points of the trough at a distance of 25, 50, 100 and 150 centimeters from the water supply source. A constant moisture content of 15% was found, regardless of the day or the sampling point. Furthermore, the level of water in the vessel fell only very slightly over the eight day period.

In order to assess the effect of a source of heat on the surface of the trough, infrared lamps were provided 50 cm above the surface, of four 1000 watts/220 volts. A dry zone was found to appear at the surface of the trough, but the interior of the soil remained moist. Shortly after removal of the source of heat, the dry zone of the surface of the soil disappeared.

EXAMPLE 2

Pulp was produced as in Example 1 and placed between two webs of non-woven fabric weighing 210 g/m$^2$. The fabric was formed from continuous filaments of poly(ethylene glycol terephthalate). The irrigation device of 350 cm long and 45 cm wide thus produced was placed in a trough one meter wide, three meters long and 0.50 meters deep, filled with soil, at a depth of 15 centimeters, over half the width and over the entire length of the trough. Seeds of a half long, 18 day type of radish were sown over the whole trough, and the part containing the irrigation device was connected to a supply source in the form of a vessel containing 10 liters of water. The part not containing the irrigation device was watered regularly. As of three weeks, it was found that the radishes which had grown in the zone containing the irrigation device, had 18 centimeter high leaves, while the watered radishes had leaves which were only 13 centimeters high. Furthermore, it was found that only 4.5 liters of water were used with the irrigation device, while 7 liters of water were used with the other half of the trough, still producing inferior results.

EXAMPLE 3

Figure 2:
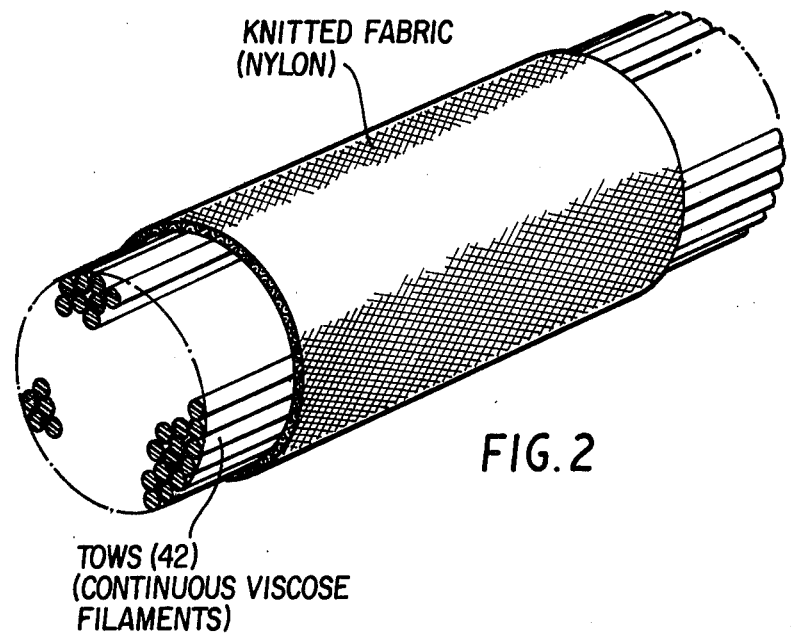

An irrigation device according to the subject invention was produced by placing 42 tows, weighing 28 g/m of continuous viscous filaments, each of gauge 17 dtex, in an envelope formed from a knitted fabric of a continuous yarn of poly(hexamethylene adipamide) of gauge 110 dtex/30 strands. A section of the irrigation device is shown schematically in FIG. 2. The irrigation device of 12 cm diameter and 250 cm long thus produced were used for moistening roots of young shrubs in a reafforestation zone having a low water content. The loss of water observed with conventional irrigation devices was avoided and the moisture was sufficiently maintained around the roots of the shrubs, without interference of the development of the latter.

What is claimed is:

1. An irrigation system for the irrigation of soils to facilitate the growth of plants, trees, crops or germination of seeds, wherein it is desired to regulate and meter the moisture level of soil, said system comprising an absorbent product filling contained within a permeable textile filter envelope, wherein the absorbent product filling is an amorphous, synthetic polymer pulp or a textile in the form of a tow of hydrophilic continuous filaments, said system being connected to and in fluid flow communication with a liquid supply source.

2. The irrigation device according to claim 1, wherein the absorbent product filling is an amorphous pulp having a bulk density of between 0.01 and 0.5 and a specific surface area measured by the Brunauer-Emmet-Teller (B.E.T.) method of between 2 and 12 m$^2$/g.

3. The irrigation device according to claim 2, wherein said synthetic polymer is a polyamide or polyester.

4. The irrigation device according to claim 1, wherein said absorbent product filler is a textile in the form of a tow of continuous hydrophilic filaments.

5. The irrigation device according to claim 1, which is tubular in cross-section.

6. The irrigation device according to claim 1, which is in the shape of a bag made from the filter textile envelope filled with the absorbent product filler.

7. The irrigation device according to claim 1, wherein the absorbent product filler is placed between 2 webs of the textile filter envelope material.

* * * * *